US010882009B2

(12) United States Patent
Scherzer et al.

(10) Patent No.: US 10,882,009 B2
(45) Date of Patent: Jan. 5, 2021

(54) WATER-TIGHT BREATHABLE MEMBRANE

(71) Applicant: BASF SE, Ludwigshafen am Rhein (DE)

(72) Inventors: Dietrich Scherzer, Neustadt (DE); Frank Prissok, Lemfoerde (DE); Lena Arnold, Mannheim (DE); Juergen Ahlers, Gross-Rohrheim (DE); Martin Weber, Maikammer (DE)

(73) Assignee: BASF SE, Ludwigshafen am Rhein (DE)

( * ) Notice: Subject to any disclaimer, the term of this patent is extended or adjusted under 35 U.S.C. 154(b) by 150 days.

(21) Appl. No.: 16/069,206

(22) PCT Filed: Jan. 16, 2017

(86) PCT No.: PCT/EP2017/050767
§ 371 (c)(1),
(2) Date: Jul. 11, 2018

(87) PCT Pub. No.: WO2017/121893
PCT Pub. Date: Jul. 20, 2017

(65) Prior Publication Data
US 2019/0001279 A1  Jan. 3, 2019

(30) Foreign Application Priority Data

Jan. 15, 2016 (EP) .................................... 16151508

(51) Int. Cl.
| | | |
|---|---|---|
| *B01D 69/14* | (2006.01) | |
| *B01D 69/02* | (2006.01) | |
| *B01D 71/26* | (2006.01) | |
| *B01D 71/54* | (2006.01) | |
| *C08J 5/18* | (2006.01) | |
| *C08K 7/22* | (2006.01) | |
| *B01D 53/22* | (2006.01) | |
| *C08K 5/56* | (2006.01) | |
| *B82Y 30/00* | (2011.01) | |
| *C08K 5/00* | (2006.01) | |

(52) U.S. Cl.
CPC ......... *B01D 69/148* (2013.01); *B01D 53/228* (2013.01); *B01D 69/02* (2013.01); *B01D 71/26* (2013.01); *B01D 71/54* (2013.01); *C08J 5/18* (2013.01); *C08K 5/56* (2013.01); *C08K 7/22* (2013.01); *B01D 2325/04* (2013.01); *B01D 2325/20* (2013.01); *B01D 2325/38* (2013.01); *B82Y 30/00* (2013.01); *C08J 2323/06* (2013.01); *C08J 2375/04* (2013.01); *C08J 2375/08* (2013.01); *C08K 5/0091* (2013.01)

(58) Field of Classification Search
CPC .... B01D 53/228; B01D 69/148; B01D 71/26; B01D 71/48; B01D 71/52; B01D 71/54; B01D 71/53; B01D 71/68; C08K 5/0091; C08K 5/56; C08K 7/22; C08J 5/18
See application file for complete search history.

(56) References Cited

U.S. PATENT DOCUMENTS

| | | | | |
|---|---|---|---|---|
| 5,866,025 | A * | 2/1999 | Kataoka ................. | B29C 33/40 249/114.1 |
| 7,637,983 | B1 * | 12/2009 | Liu ....................... | B01D 69/148 210/500.21 |
| 8,524,932 | B2 | 9/2013 | Leung et al. | |
| 2010/0041295 | A1 | 2/2010 | Malz et al. | |
| 2011/0297610 | A1 | 12/2011 | Auras et al. | |
| 2013/0047843 | A1 * | 2/2013 | Matteucci ............ | B01D 53/228 95/45 |
| 2013/0305920 | A1 * | 11/2013 | Yang .................... | B01D 53/228 95/45 |
| 2014/0212940 | A1 * | 7/2014 | Yang .................... | B01D 69/148 435/157 |
| 2015/0283520 | A1 * | 10/2015 | Hill ....................... | B01D 69/148 95/45 |
| 2016/0361702 | A1 * | 12/2016 | Cohen .................... | B01D 53/04 |

FOREIGN PATENT DOCUMENTS

| | | |
|---|---|---|
| DE | 101 11 230 A1 | 9/2002 |
| EP | 0 790 253 A2 | 8/1997 |
| WO | WO 03/101975 A1 | 12/2003 |
| WO | WO 2007/144324 A1 | 12/2007 |

(Continued)

OTHER PUBLICATIONS

Dai, Ying et al., "Ultem(R)/ZIF-8 mixed matrix hollow fiber membranes for CO2/N2 separations", Journal of Membrane Science, 401-402, 2012, pp. 76-82. (Year: 2012).*
International Preliminary Report on Patentability dated Jul. 19, 2018 in PCT/EP2017/050767.
"Manual of Symbols and Terminology for Physicochemical Quantities and Units—Appendix II", Pure & Applied Chem., vol. 46, 1976, 19 Pages.
International Search Report dated Mar. 24, 2017, in PCT/EP2017/050767, filed Jan. 16, 2017.
Diaz, K. et al., "$CO_2$ Transport in Polysulfone Membranes Containing Zeolitic Imidazolate Frameworks as Determined by Permeation and PFG NMR Techniques", Macromolecules, vol. 43, No. 1, XP055282381, Jan. 12, 2010, pp. 316-325.

(Continued)

Primary Examiner — Jason M Greene
(74) Attorney, Agent, or Firm — Oblon, McClelland, Maier & Neustadt, L.L.P.

(57) ABSTRACT

The present invention relates to shaped bodies comprising a composition (Z1), wherein said composition comprises at least one polymer having an elongation at break of >30% and at least one porous metal-organic framework material, to processes for producing shaped bodies of this kind and to the use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of greater than 1000 g/(m²*d), based on a film thickness of 10 μm.

7 Claims, No Drawings

(56) References Cited

FOREIGN PATENT DOCUMENTS

| WO | WO 2008/087087 A1 | 7/2008 |
|----|-------------------|--------|
| WO | WO 2009/056184 A1 | 5/2009 |
| WO | WO 2011/081779 A2 | 7/2011 |
| WO | WO 2012/077030 A1 | 6/2012 |
| WO | WO 2012/159224 A1 | 11/2012 |
| WO | WO 2015/144695 A1 | 10/2015 |

OTHER PUBLICATIONS

Dai, Y. et al., "Ultem®/ZIF-8 mixed matrix hollow fiber membranes for $CO_2/N_2$ separations", Journal of Membrane Science, vol. 401, XP028472472, Jan. 26, 2012, pp. 76-82.

Ordonez, M.J.C. et al., "Molecular sieving realized with ZIF-8/Matrimide® mixed-matrix membranes", Journal of Membrane Science, vol. 361, XP027152015, Sep. 30, 2010, pp. 28-37.

* cited by examiner

WATER-TIGHT BREATHABLE MEMBRANE

The present invention relates to shaped bodies comprising a composition (Z1), wherein said composition comprises at least one polymer having an elongation at break of >30% and at least one porous metal-organic framework material, to processes for producing shaped bodies of this kind and to the use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of greater than 1000 g/(m²*d), based on a film thickness of 10 μm.

The prior art discloses that the properties of polymer membranes can be modified by suitable additives, for example inorganic materials.

The prior art also discloses that metal-organic framework materials can also be used in order to modify the properties of polymer compositions. Metal-organic framework materials are known in principle from the prior art, for example from DE 101 11 230 A or EP 790 253 A, and are recommended for gas cleaning or gas storage inter alia. For instance, WO 2007/144324 describes a method of depleting or removing methane from methane-containing gas mixtures, such a process being based primarily on adsorption-desorption processes. Metal-organic framework materials are also known as a solid-state catalyst for a wide variety of different organic reaction types. For instance, WO 2003/101975 discloses use as a catalyst for the epoxidation of organic compounds.

Moreover, WO 2009/056184 A1, for example, discloses a sorption filter material, especially adsorption filter material, comprising a metal-organic framework material, which is suitable for the production of protective materials and for the production of filters and filter materials.

WO 2011/081779 A2 relates to mixed matrix membranes that are produced by dispersion of metal-organic framework materials having high surface area in a polymer matrix. The use of these mixed matrix membranes for gas separation applications, for example removal of CO2 from natural gas, is likewise disclosed. U.S. Pat. No. 7,637,983 B1 also discloses mixed membranes of this kind.

Various applications require materials which have high water vapor permeability on the one hand but are watertight on the other hand. Known materials for such applications are Gore-Tex® materials. Gore-Tex® consists of a microporous membrane composed of stretched (expanded) polytetrafluoroethylene (PTFE) which is watertight but water vapor-permeable and hence breathable. It is disadvantageous that Gore-Tex® is relatively stiff owing to its structure, and its disposal is considered to be problematic, as is the case for all materials comprising halogenated hydrocarbons.

It was thus an object of the present invention to provide materials or shaped bodies which, as well as good water vapor permeability, are also watertight to a sufficient degree. It was a further object of the present invention to provide materials of this kind which are additionally available inexpensively and which avoid the use of materials that can be classified as materials of concern. More particularly, it was an object of the present invention to provide shaped bodies that can be used as coatings or membranes.

This object is achieved in the context of the present invention by a shaped body comprising a composition (Z1), said composition comprising at least the following components:

(i) at least one polymer having an elongation at break of >30%, and (ii) at least one porous metal-organic framework material.

The present invention further relates to a composition (Z1), said composition comprising at least the following components:

(i) at least one polymer having an elongation at break of >30%, and (ii) at least one porous metal-organic framework material.

In a further aspect, the present invention also relates to a process for producing a shaped body, comprising the steps of (a) providing a composition (Z1), said composition comprising at least the following components:
  (i) at least one polymer having an elongation at break of >30%, and
  (ii) at least one porous metal-organic framework material;

(b) producing a shaped body from the composition (Z1) by means of extrusion, injection molding, casting, blowing or sintering methods, or lamination methods.

It has been found that, surprisingly, the addition of metal-organic framework materials to usually hydrophobic and water vapor-impermeable polymers affords materials which, in spite of retention of watertightness, have significantly elevated water vapor permeability.

According to the invention, the composition (Z1) comprises at least one polymer having an elongation at break of >30% and at least one porous metal-organic framework material. Unless stated otherwise, in the context of the present invention, elongation at break is determined according to ISO 527-1.

In the context of the present invention, the composition (Z1) may comprise further additives customary in polymer chemistry, for example processing auxiliaries, plasticizers, stabilizers or dyes. Suitable compounds are known per se to those skilled in the art and are described, for example, in the handbook "Kunststoffadditive" [Plastics Additives] by R. Gächter and H. Müller, Hanser Verlag 1990.

In principle, in the context of the present invention, suitable metal-organic framework materials are all of those that have a suitable pore size and sufficient compatibility with the polymer used. In the context of the present invention, the composition (Z1) may also comprise two or more metal-organic framework materials.

Metal-organic framework materials, also referred to as MOFs, are microporous crystalline materials formed from metallic node points and organic molecules as connecting elements between the node points. It is possible to form three-dimensional networks which, depending on the linkers, comprise pores of different size.

MOFs are notable for high internal surface areas, high crystallinity and defined pore sizes. The pore size can be fixed exactly via the size of the organic ligands. Owing to their organic constituents, they have good incorporatability into polymers. For materials that belong to the class of the porous metal-organic framework compounds, as well as the abbreviation MOF, there is also our great multitude of abbreviated names such as IRMOF (=IsoReticular Metal-Organic Framework), HKUST (=Hong Kong University of Science & Technology), MIL (=Matériaux de l'Institut Lavoisier), ZIF (=Zeolitic Imidazolate Frameworks), COF (=Covalent Organic Frameworks), BAF (=BergAkademie Freiberg Framework), MFU (=Metal-Organic Framework Ulm University), or TOF (=Thorium Organic Framework).

Metal-organic framework materials that are suitable in the context of the present invention comprise at least one at least bidentate organic compound coordinatively bonded to at least one metal ion. Suitable metal-organic framework materials according to the present invention comprise pores, especially micro- and/or mesopores. Micropores are defined as those having a diameter of 2 nm or less, and mesopores are defined by a diameter in the range from 2 to 50 nm, in each case according to the definition as specified in Pure Applied Chem. 45, page 71/page 79 (1976). The presence of micro- and/or mesopores can be verified with the aid of sorption measurements and these measurements determine the absorption capacity of the MOF for nitrogen at 77 Kelvin according to DIN 66131 and/or DIN 66134.

Preferably, the specific surface area—calculated by the Langmuir model (DIN 66131, 66134)—for an MOF in powder form is more than 5 $m^2/g$, more preferably more than 10 $m^2/g$, more preferably more than 50 $m^2/g$, even more preferably more than 500 $m^2/g$, even more preferably more than 1000 $m^2/g$ and especially preferably more than 1500 $m^2/g$.

Shaped MOF bodies may have a lower active surface area, but preferably more than 10 $m^2/g$, more preferably more than 50 $m^2/g$, even more preferably more than 500 $m^2/g$ and especially preferably more than 1000 $m^2/g$.

The metal component is preferably selected from groups Ia, IIa, IIIa, IVa to VIIIa and Ib to VIb of the Periodic Table of the Elements. Particular preference is given to Mg, Ca, Sr, Ba, Sc, Y, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, Al, Ga, In, Tl, Si, Ge, Sn, Pb, As, Sb and Bi. More preferred are Zn, Cu, Ni, Pd, Pt, Ru, Rh and Co.

Most preferably, a metal ion from the group consisting of $Zn^{2+}$, $Al^{3+}$ and $Mg^{2+}$ is present in the porous metal-organic framework material of the MOF.

In a further embodiment, the present invention accordingly also relates to a shaped body as described above, wherein the porous metal-organic framework material comprises zinc, magnesium or aluminum as metal.

The expression "at least bidentate organic compound" refers to an organic compound comprising at least one functional group capable of forming at least two, preferably two, coordinate bonds to a given metal ion and/or one coordinate bond each to two or more, preferably to two, metal atoms.

Functional groups via which the coordinate bonds mentioned can be formed especially include the following functional groups: $-CO_2H$, $-CS_2H$, $-NO_2$, $-B(OH)_2$, $-S_3H$, $-Si(OH)_3$, $-Ge(OH)_3$, $-Sn(OH)_3$, $-Si(SH)_4$, $-Ge(SH)_4$, $-Sn(SH)_3$, $-PO_3H$, $-AsO_3H$, $-AsO_4H$, $-P(SH)_3$, $-As(SH)_3$, $-CH(RSH)_2$, $-C(RSH)_3$, $-CH(RNH_2)_2$—$C(RNH_2)_3$, $-CH(ROH)_2$, $-C(ROH)_3$, $-CH(RCN)_2$, $-C(RCN)_3$, where R is a hydrocarbylene radical, for example an alkylene group having 1, 2, 3, 4 or 5 carbon atoms, such as a methylene, ethylene, n-propylene, isopropylene, n-butylene, isobutylene, tert-butylene or n-pentylene group, or an arylene group comprising 1 or 2 aromatic rings, for example 2 C6 rings, which may optionally be fused and may independently be suitably substituted by at least one substituent each, and/or which may independently each comprise at least one heteroatom, for example N, O and/or S. In likewise preferred embodiments, mention should be made of functional groups in which the abovementioned R radical is absent. In this regard, mention should be made of $-CH(SH)_2$, $-C(SH)_3$, $-CH(NH_2)_2$, $-C(NH_2)_3$, $-CH(OH)_2$, $-C(OH)_3$, $-CH(CN)_2$ or $-C(CN)_3$ inter alia.

The at least two functional groups may in principle be bonded to any suitable organic compound, provided that it is ensured that the organic compound having these functional groups is capable of formation of the coordinate bond and production of the framework material.

Preferably, the organic compounds containing the at least two functional groups derive from a saturated or unsaturated aliphatic compound or an aromatic compound or a compound which is both aliphatic and aromatic.

As well as these at least bidentate organic compounds, the metal-organic framework material may also comprise one or more monodentate ligands.

Further metal ions, at least bidentate organic compounds and solvents for the production of metal-organic framework materials are described, for example, in WO 2015/144695 A1.

The pore size of the metal-organic framework material can be controlled via selection of the suitable ligand and/or the at least bidentate organic compound. It is generally the case that the larger the organic compound, the greater the pore size. For example, the average pore size of a metal-organic framework material preferred in the context of the present invention is in the range from 0.1 nm to 5 nm, further preferably in the range from 0.2 nm to 4 nm, more preferably in the range from 0.2 to 3 nm.

In a further embodiment, the present invention accordingly also relates to a shaped body as described above, wherein the porous metal-organic framework material has an average pore diameter in the range from 0.2 to 4 nm.

It has been found that, surprisingly, metal-organic framework materials having such pore diameters are particularly suitable for the production of watertight, water vapor-permeable membranes.

The structure of the metal-organic compounds or the pore size thereof can be determined by various physical methods, for example by means of gas sorption measurements, x-ray diffractometry or scanning electron microscopy.

According to the invention, the metal-organic framework material can be used either in pulverulent form or in relatively coarse crystalline form. The average particle size should not exceed 10 μm. In films, membranes or laminated layers, the average particle size should not exceed the thickness of the film, membrane or the coating.

In the context of the present invention, the composition (Z1) comprises at least one polymer having an elongation at break of >30%. According to the invention, it is possible to use any polymers known to the person skilled in the art that have an elongation at break of >30% and sufficient compatibility (miscibility) with the metal-organic framework material used, in order to assure the production of a composition (Z1) or a shaped body.

The polarity of the multidentate coordinate groups can be used to adjust the compatibility of the components of the composition (Z1) and the hydrophilicity.

In the context of the present invention, thermoplastic polymers are especially suitable, preferably thermoplastic polyurethanes, thermoplastic polyesters, polyethers, polyetheresters, polyketones, polyethersulfones, polysulfones, polyetherimides, polyamides or thermoplastic polyolefins, for example polyethylene, polypropylene, polybutadiene or copolymers thereof.

In a further embodiment, the present invention accordingly also relates to a shaped body as described above, wherein the polymer is selected from thermoplastic polyurethanes, polyesters, polyethers, polyetheresters, polyketones, polyethersulfones, polysulfones, polyetherimides, polyamides and polyolefins.

Particular preference is given in the context of the present invention to thermoplastic polyurethanes, for example those having a Shore A hardness in the range from 40 to 98 or in the range from 45 to 98 or in the range from 40 to 90.

Preferred TPUs are TPUs having a Shore A hardness of 40 to 90 which comprise MDI (methylene diphenylene diisocyanates) as isocyanate component.

In the context of the present invention, the nature of the shaped body may also vary within wide ranges. For instance, the shaped body may be a component or else a flat structure, for example a film, membrane or laminate. According to the invention, it is also possible that the film or membrane takes the form of a multilayer structure in combination with further films or plies. Accordingly, the shaped body in the context of the present invention may also be a film in the form of a coating or laminated with a textile carrier.

A textile laminate refers to a multilayer, flexible sheetlike structure comprising at least one textile (woven, knit or nonwoven) bonded to further layers over its area. These further layers may likewise be textiles, plastic films or metal foils, foam or others. The bonding is effected in a cohesive manner, for example by bonding or melting in special textile machines.

The lamination gives rise to a material that combines the properties of its starting materials: for instance, a strong weave gives rise to tensile strength and wear resistance, a polymer film to water- and windproofing, and bonding to a metal film results in an opaque material that also reflects thermal radiation under some circumstances.

Textile laminates are particularly known, in particular, for their use as materials for temperature and moisture control in functional apparel. The textile here is generally laminated to a very thin membrane film which is at least windproof and breathable, and usually also watertight.

By contrast with most other laminate materials, textile laminates can generally also be processed further like textiles, for example by stitching.

In a further embodiment, the present invention accordingly also relates to a shaped body as described above, wherein the shaped body is a film, membrane or laminate.

According to the invention, the form and material thickness of the shaped body may vary within wide ranges. Typically, a membrane or film in the context of the present invention has a thickness in the range from 1 to 5000 μm, further preferably in the range from 2 to 1000 μm, more preferably in the range from 5 to 500 μm.

In a further embodiment, the present invention accordingly also relates to a shaped body as described above, wherein the film, membrane or laminate has a thickness in the range from 1 to 500 μm.

The composition (Z1) may comprise the polymer and the metal-organic framework material in different ratios, provided that it is ensured that shaped body comprising the composition (Z1) can be produced. This composition (Z1) may comprise further components, for example further polymers or further auxiliaries and additives.

Preferably, the composition (Z1) comprises the porous metal-organic framework material in an amount in the range from 0.1% to 20% by weight, further preferably in the range from 1% to 10% by weight, based in each case on the overall composition (Z1).

Further additives (processing auxiliaries, stabilizers) may be present in amounts of up to 10% by weight based on the overall composition (Z1).

In a further embodiment, the present invention accordingly also relates to a shaped body as described above, wherein the proportion of the porous metal-organic framework material in the composition (Z1) is in the range from 0.1% to 20% by weight.

In a further aspect, the present invention also relates to a process for producing a shaped body, comprising the steps of
(a) providing a composition (Z1), where said composition comprises at least the following components:
  (i) at least one polymer having an elongation at break of >30%, determined according to ISO 527-1, and
  (ii) at least one porous metal-organic framework material;
(b) producing a shaped body from the composition (Z1) by means of extrusion, injection molding, casting, blowing or sintering methods, or lamination methods.

In a further embodiment, the present invention accordingly also relates to a process as described above, wherein the shaped body is a film, membrane or laminate.

The process of the invention comprises steps (a) and (b). Step (a) provides a composition (Z1). Composition (Z1) in the context of the present invention may be obtained by any suitable methods known to those skilled in the art, especially by standard mixing methods, for example by mixing in an extruder or kneader or by mixing in solution.

In step (b), a shaped body is produced by means of extrusion, injection molding, casting, blowing, sintering or laminating methods, or agglomeration methods. Suitable methods are known in principle to those skilled in the art.

In the production, it is possible to add further additives to the composition (Z1), for example processing auxiliaries, plasticizers or stabilizers, or optionally solvents. The further additives may be used, for example, in an amount of up to 50% by weight based on the sum total of the mixture of additives and the composition (Z1).

The shaped bodies of the invention, or the shaped bodies obtained or obtainable by a process of the invention, have good water vapor permeability coupled with high watertightness. The water vapor permeability according to DIN 53122 at 38° C./90% rel. humidity is, for example, greater than 1000 g/(m$^2$*d), based on a film thickness of 10 μm.

In a further aspect, the present invention also relates to the use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of, for example, greater than 1000 g/(m$^2$*d), based on a film thickness of 10 μm.

Preferably, the water vapor permeability according to DIN 53122 at 38° C./90% rel. humidity is greater than 1000 g/(m$^2$*d), further preferably greater than 2000 g/(m$^2$*d) and more preferably greater than 5000 g/(m$^2$*d), based in each case on a film thickness of 10 μm.

In addition, the films, membranes or laminates obtained preferably have a watertightness of 0.2 bar to 5.0 bar (2000 mm water column, measured according to DIN EN 20811: 1992, and also ISO 811), preferably of 0.5 bar to 2.0 bar (5000 mm water column, measured according to DIN EN 20811:1992, and also ISO 811) and more preferably of 0.5 bar to 1 bar (10000 mm water column, measured according to DIN EN 20811:1992, and also ISO 811).

In a further aspect, the present invention also relates to the use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of greater than 1000 g/(m$^2$*d), based on a film thickness of 10 µm and a watertightness of 0.2 bar (2000 mm water column, measured according to DIN EN 20811:1992, and also ISO 811).

The shaped bodies of the invention, such as films, membranes or laminates, especially the membranes and films of the invention, may be used, for example, in functional apparel, for example hiking jackets, but also for climate control of buildings, vehicles or apparatuses.

Further applications are, for example, injection-molded housings for electronic applications or containers for liquids.

The present invention is illustrated in detail by the following embodiments and combinations of embodiments that result from the corresponding dependency references and references:

1. A shaped body comprising a composition (Z1), said composition comprising at least the following components:
    (i) at least one polymer having an elongation at break of >30%, and
    (ii) at least one porous metal-organic framework material.
2. The shaped body according to embodiment 1, wherein the porous metal-organic framework material has an average pore diameter in the range from 0.2 to 4 nm.
3. The shaped body according to embodiment 1 or 2, wherein the porous metal-organic framework material comprises zinc, magnesium or aluminum as metal.
4. The shaped body according to any of embodiments 1 to 3, wherein the polymer is selected from thermoplastic polyurethanes, polyesters, polyethers, polyetheresters, polyketones, polyethersulfones, polysulfones, polyetherimides, polyamides and polyolefins.
5. The shaped body according to any of embodiments 1 to 4, wherein the shaped body is a film, membrane or laminate.
6. The shaped body according to embodiment 5, wherein the film, membrane or laminate has a thickness in the range from 1 to 500 µm.
7. The shaped body according to any of embodiments 1 to 6, wherein the proportion of the porous metal-organic framework material in the composition (Z1) is in the range from 0.1% to 20% by weight.
8. A process for producing a shaped body, comprising the steps of
    (a) providing a composition (Z1), where said composition comprises at least the following components:
        (i) at least one polymer having an elongation at break of >30%, determined according to ISO 527-1, and
        (ii) at least one porous metal-organic framework material;
    (b) producing a shaped body from the composition (Z1) by means of extrusion, injection molding, casting, blowing or sintering methods, or lamination methods.
9. The process according to embodiment 8, wherein the shaped body is a film, membrane or laminate.
10. The use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of greater than 1000 g/(m$^2$*d), based on a film thickness of 10 µm.
11. The use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of greater than 1000 g/(m$^2$*d), based on a film thickness of 10 µm and a watertightness of 0.2 bar, measured according to DIN EN 20811:1992.
12. A shaped body comprising a composition (Z1), said composition comprising at least the following components:
    (i) at least one polymer having an elongation at break of >30%, and
    (ii) at least one porous metal-organic framework material,
    wherein the shaped body is a film, membrane or laminate,
    wherein the polymer is selected from thermoplastic polyurethanes, polyesters, polyethers, polyetheresters, polyketones, polyethersulfones, polysulfones, polyetherimides, polyamides and polyolefins, and
    wherein the porous metal-organic framework material comprises zinc, magnesium or aluminum as metal.
13. The shaped body according to claim 12, wherein the porous metal-organic framework material has an average pore diameter in the range from 0.2 to 4 nm.
14. The shaped body according to claim 12 or 13, wherein the film, membrane or laminate has a thickness in the range from 1 to 500 µm.
15. The shaped body according to any of claims 12 to 14, wherein the proportion of the porous metal-organic framework material in the composition (Z1) is in the range from 0.1% to 20% by weight.
16. A process for producing a shaped body selected from the group consisting of a film, membrane or laminate, comprising the steps of
    (a) providing a composition (Z1), said composition comprising at least the following components:
        (i) at least one polymer having an elongation at break of >30%, wherein the polymer is selected from thermoplastic polyurethanes, polyesters, polyethers, polyetheresters, polyketones, polyethersulfones, polysulfones, polyetherimides, polyamides and polyolefins, and
        (ii) at least one porous metal-organic framework material, wherein the porous metal-organic framework material comprises zinc, magnesium or aluminum as metal;
    (b) producing a shaped body selected from the group consisting of a film, membrane or laminate from the composition (Z1) by means of extrusion, injection molding, casting, blowing or sintering methods, or lamination methods.
17. The use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of greater than 1000 g/(m$^2$*d), based on a film thickness of 10 µm,
    wherein the polymer is selected from thermoplastic polyurethanes, polyesters, polyethers, polyetheresters, polyketones, polyethersulfones, polysulfones, polyetherimides, polyamides and polyolefins, and
    wherein the porous metal-organic framework material comprises zinc, magnesium or aluminum as metal.
18. The use of a composition (Z1) comprising at least one polymer having an elongation at break of >30% and at least one porous metal-organic framework material for production of a film, membrane or laminate having a water vapor permeability according to DIN 53122 at 38° C./90% rel. humidity of greater than 1000 g/(m$^2$*d), based on a film thickness of 10 µm and a watertightness of 0.2 bar, measured according to DIN EN 20811:1992,
    wherein the polymer is selected from thermoplastic polyurethanes, polyesters, polyethers, polyetheresters, polyketones, polyethersulfones, polysulfones, polyetherimides, polyamides and polyolefins, and wherein the porous metal-organic framework material comprises zinc, magnesium or aluminum as metal.

19. A shaped body comprising a composition (Z1), said composition comprising at least the following components:
   (i) at least one polymer having an elongation at break of >30%, and
   (ii) at least one porous metal-organic framework material.

20. The shaped body according to embodiment 19, wherein the porous metal-organic framework material has an average pore diameter in the range from 0.2 to 4 nm.

21. The shaped body according to embodiment 19 or 20, wherein the porous metal-organic framework material comprises zinc, magnesium or aluminum as metal.

22. The shaped body according to any of embodiments 19 to 21, wherein the polymer is selected from thermoplastic polyurethanes, polyesters, polyethers, polyetheresters, polyketones, polyethersulfones, polysulfones, polyetherimides, polyamides and polyolefins.

23. The shaped body according to any of embodiments 19 to 22, wherein the shaped body is a film, membrane or laminate.

24. The shaped body according to any of embodiments 19 to 23, wherein the shaped body is a membrane.

25. The shaped body according to any of embodiments 19 to 24, wherein the shaped body is obtainable or obtained by extrusion methods.

26. The shaped body according to embodiment 23, wherein the film, membrane or laminate has a thickness in the range from 1 to 500 µm.

27. The shaped body according to any of embodiments 24 to 25, wherein the film, membrane or laminate has a thickness in the range from 1 to 500 µm.

28. The shaped body according to any of embodiments 19 to 27, wherein the proportion of the porous metal-organic framework material in the composition (Z1) is in the range from 0.1% to 20% by weight.

29. A process for producing a shaped body, comprising the steps of
   (a) providing a composition (Z1), said composition comprising at least the following components:
      (i) at least one polymer having an elongation at break of >30%, and
      (ii) at least one porous metal-organic framework material;
   (b) producing a shaped body from the composition (Z1) by means of extrusion, injection molding, casting, blowing or sintering methods, or lamination methods.

30. The process according to embodiment 29, wherein the shaped body is a film, membrane or laminate.

31. The process according to either of embodiments 29 and 30, wherein the shaped body is produced in step (b) by means of extrusion.

32. The use of a composition (Z1) comprising at least one polymer having an elongation at break of >30%, and at least one porous metal-organic framework material for production of a film, membrane or laminate having a water vapor permeability according to DIN 53122 at 38° C. and 90% relative humidity of greater than 1000 g/(m²*d), based on a film thickness of 10 µm.

33. The use of a composition (Z1) comprising at least one polymer having an elongation at break of >30%, and at least one porous metal-organic framework material for production of a film, membrane or laminate having a water vapor permeability according to DIN 53122 at 38° C. and 90% relative humidity of greater than 1000 g/(m²*d), based on a film thickness of 10 µm and a watertightness of 0.2 bar, measured according to DIN EN 20811:1992.

34. A shaped body comprising a composition (Z1), said composition comprising at least the following components:
   (i) at least one polymer having an elongation at break of >30%, determined according to ISO 527-1, and
   (ii) at least one porous metal-organic framework material.

35. The shaped body according to embodiment 34, wherein the porous metal-organic framework material has an average pore diameter in the range from 0.2 to 4 nm.

36. The shaped body according to embodiment 34 or 35, wherein the porous metal-organic framework material comprises zinc, magnesium or aluminum as metal.

37. The shaped body according to any of embodiments 34 to 36, wherein the polymer is selected from thermoplastic polyurethanes, polyesters, polyethers, polyetheresters, polyketones, polyethersulfones, polysulfones, polyetherimides, polyamides and polyolefins.

38. The shaped body according to any of embodiments 34 to 37, wherein the shaped body is a film, membrane or laminate.

39. The shaped body according to any of embodiments 34 to 38, wherein the shaped body is a membrane.

40. The shaped body according to any of embodiments 34 to 39, wherein the shaped body is obtainable or obtained by an extrusion method.

41. The shaped body according to embodiment 38, wherein the film, membrane or laminate has a thickness in the range from 1 to 500 µm.

42. The shaped body according to either of embodiments 39 and 40, wherein the film, membrane or laminate has a thickness in the range from 1 to 500 µm.

43. The shaped body according to any of embodiments 34 or 42, wherein the proportion of the porous metal-organic framework material in the composition (Z1) is in the range from 0.1% to 20% by weight.

44. A process for producing a shaped body, comprising the steps of
   (a) providing a composition (Z1), said composition comprising at least the following components:
      (i) at least one polymer having an elongation at break of >30%, determined according to ISO 527-1, and
      (ii) at least one porous metal-organic framework material;
   (b) producing a shaped body from the composition (Z1) by means of extrusion, injection molding, casting, blowing or sintering methods, or lamination methods.

45. The process according to embodiment 44, wherein the shaped body is a film, membrane or laminate.

46. The process according to either of embodiments 44 and 45, wherein the shaped body is produced in step (b) by means of extrusion.

47. The use of a composition (Z1) comprising at least one polymer having an elongation at break of >30%, determined according to ISO 527-1, and at least one porous metal-organic framework material for production of a film, membrane or laminate having a water vapor permeability according to DIN 53122 at 38° C. and 90% relative humidity of greater than 1000 g/(m²*d), based on a film thickness of 10 µm.

48. The use of a composition (Z1) comprising at least one polymer having an elongation at break of >30%, determined according to ISO 527-1, and at least one porous metal-organic framework material for production of a film, membrane or laminate having a water vapor permeability according to DIN 53122 at 38° C. and 90% relative humidity of greater than 1000 g/(m²*d), based on a film thickness of 10

μm and a watertightness of 0.2 bar, measured according to DIN EN 20811:1992.

The invention is illustrated hereinafter by examples.

EXAMPLES

1. Starting Substances

Starting substances according to table 1 below were used:

TABLE 1

| \multicolumn{3}{c}{starting substances} | | |
|---|---|---|
| Name | Chemical composition | Source |
| Iso | 4,4'-Methylene diphenylene diisocyanate | BASF |
| Polyol1 | Polytetrahydrofuran, Mn[1]: ~1000, OH number: 112.2 | BASF |
| Polyol2 | Polytetrahydrofuran, Mn[1]: ~2000, OH number: 56 | BASF |
| KV | Butane-1,4-diol, chain extender | BASF |
| AO | Antioxidant | BASF |
| GL | Amide wax | Croda |

[1]Mn is the number-average molecular weight

2. Provision of a Thermoplastic Polyurethane

2.1 TPU1

612 g of Polyol1 and 59.4 g of KV were weighed out in a 2 L tinplate bucket and heated up to 80° C. Subsequently, 10 g of AO were added while stirring at 220 rpm. After a stirring step for 2 min for homogenization, 318.4 g of Iso were added to the solution, which was stirred (45 s) until the solution had reached a temperature of 110° C. The reaction mixture was then poured into a flat dish and kept at 125° C. on a hotplate for 10 min. Thereafter, the resultant slab was heat-treated in a heating cabinet at 100° C. for 24 h.

2.2 TPU2

344.1 g of Polyol1, 344.1 g of Polyol2 and 45.3 g of KV were weighed out in a 2 L tinplate bucket and heated up to 80° C. Subsequently, 10 g of AO and 0.5 g of GL were added while stirring at 220 rpm. After a stirring step for 2 min for homogenization, 256 g of Iso were added to the solution, which was stirred (45 s) until the solution had reached a temperature of 110° C. The reaction mixture was then poured into a flat dish and kept at 125° C. on a hotplate for 10 min. Thereafter, the resultant slab was heat-treated in a heating cabinet at 100° C. for 24 h.

The material thus produced was comminuted in a mill to give a pourable granular material, dried again and dispensed into aluminum-coated PE bags for further use.

2.3 LDPE (Lyondell-Basell NA 940000) and Thermoplastic Polyurethane TPU2 Were Processed Together with the MOFs Used by Means of Film Extrusion to Give the Test Films The films were produced using an Xplore mini laboratory extruder (Microcompounder MC15 with CFPL microcast film attachment). The MOFs were premixed in powder form with the polymer pellets in the amounts specified and then extruded to give the film.

Alternatively, the TPUs were used to produce a 10% solution in THF, the MOFs were dispersed in this solution and cast films were produced by means of a coating bar. The tests described below were conducted on these films.

The MOFs used were Basolite A520 (Al fumarate) and Z1200 (Zn 2-methylimidazolate, Lit. ZIF-8). Al fumarate is a hydrophilic MOF having a pore size of 11.5 A. ZIF-8 is notable for its hydrophobic properties, with a pore size of 8 A and a pore opening of 3.4 A.

Basolite A520 was produced according to example 2 of U.S. Pat. No. 8,524,932. Basolite Z1200 and Basosive M050 are commercially available from Sigma Aldrich.

3. Experiments with PE Film (Thickness 33-49 μm)

$H_2O$ permeation was measured at 23° C., 85% RH according to ASTMF-1249. The results are collated in table 2.

TABLE 2

| Material | Thickness (μm) | Transmission rate (g/m²/day) | Permeability (g × μm/m²/day/85% RH) |
|---|---|---|---|
| Comparative examples | | | |
| LDPE with no addition | 44.8 | 2.02 | 91.4 |
| | 47.1 | 1.88 | 86.9 |
| Examples | | | |
| LDPE + 5% by wt. of Basolite A520 MOF | 36.7 | 4.45 | 159 |
| LDPE + 5% by wt. of Basolite A520 MOF | 33.0 | 4.76 | 149 |
| LDPE + 7.5% by wt. of Basolite A520 MOF | 49.2 | 4.54 | 216 |
| LDPE + 7.5% by wt. of Basolite A520 MOF | 47.1 | 4.25 | 190 |

All films are watertight (water column 2000 mm, measured according to DIN EN 20811:1992, and also ISO 811). The addition of the MOFs increases the water vapor permeability by about a factor of 2.

4. Experiments with TPU Film Made from TPU1 and TPU-2 (Thickness 50-180 μm)

$H_2O$ permeation was measured at 38° C., 90% RH according to DIN 53122. The results are collated in table 3.

TABLE 3

| Material | Thickness (μm) | Transmission rate (g/m²/day) | Permeability (g × μm/m²/day/90% RH) |
|---|---|---|---|
| Comparative example | | | |
| TPU film with no addition | 50 | 822 | 41000 |
| Examples | | | |
| TPU1 + 1% by wt. of A520 MOF | 70 | 944 | 66100 |
| TPU1 + 2% by wt. of A520 MOF | 90 | 942 | 84700 |
| TPU1 + 5% by wt. of A520 MOF | 120 | 1384 | 166100 |
| TPU1 + 10% by wt. of A520 MOF | 180 | 2238 | 402800 |
| TPU2 + 0.25% by wt. of MOF Z1200 | 70 | 989 | 69200 |
| TPU2 + 1% by wt. of MOF Z1200 | 80 | 963 | 77000 |

TABLE 3-continued

| Material | Thickness (μm) | Transmission rate (g/m²/day) | Permeability (g × μm/m²/day/90% RH) |
|---|---|---|---|
| TPU2 + 2% by wt. of MOF Z1200 | 100 | 958 | 95800 |
| TPU2 + 5% by wt. of MOF Z1200 | 100 | 1011 | 101100 |

All films are watertight (water column 2000 mm, measured according to DIN EN 20811:1992, and also ISO 811). The specimens with 5+10% A520 were only 'watertight' to a limited degree. The addition of the MOFs increases the water vapor permeability by about a factor of 3.

The invention claimed is:

1. A shaped body, comprising a composition (Z1), wherein said composition (Z1) comprises:
   at least one polymer having an elongation at break of >30%, determined according to ISO 527-1; and
   (ii) at least one porous metal-organic framework material, wherein:
   a portion of the porous metal-organic framework material in the composition (Z1) ranges from 0.1% to 10% by weight;
   the porous metal-organic framework material has an average pore diameter in the range from 0.2 to 4 nm;
   the porous metal-organic framework material comprises zinc, magnesium or aluminum as metal;
   the polymer is selected from the group consisting of a thermoplastic polyurethane, a polyester, a polyether, a polyetherester, a polyketone, a polyethersulfone, a polysulfone, a polyetherimide, a polyamide and a polyolefin; and
   wherein the shaped body is a film, membrane or laminate and the film, the membrane or the laminate has a thickness in the range from 80 to 500 μm.

2. The shaped body according to claim 1, wherein the shaped body is a membrane.

3. The shaped body according to claim 1, wherein the shaped body is obtained by an extrusion process.

4. A process for producing a shaped body, the process comprising producing a shaped body from a composition (Z1) by an extrusion method, an injection molding method, a casting method, a blowing method, a sintering method, or a lamination method,
   wherein:
   the composition (Z1) comprises:
   (i) at least one polymer having an elongation at break of >30%, determined according to ISO 527-1, and
   (ii) at least one porous metal-organic framework material;
   a portion of the porous metal-organic framework material in the composition (Z1) ranges from 0.1% to 10% by weight;
   the porous metal-organic framework material has an average pore diameter in the range from 0.2 to 4 nm;
   the porous metal-organic framework material comprises zinc, magnesium or aluminum as metal;
   the polymer is selected from the group consisting of a thermoplastic polyurethane, a polyester, a polyether, a polyetherester, a polyketone, a polyethersulfone, a polysulfone, a polyetherimide, a polyamide and a polyolefin; and
   wherein the shaped body is a film, membrane or laminate and the film, the membrane or the laminate has a thickness in the range from 80 to 500 μm.

5. The process according to either of claim 4, wherein the shaped body is produced by an extrusion method.

6. The shaped body according to claim 1, wherein the film, the membrane or the laminate has a water vapor permeability according to DIN 53122 at 38° C. and 90% relative humidity of greater than 1000 g/(m²*d), based on a film thickness of 10 μm.

7. The shaped body according to claim 1, wherein the film, the membrane or the laminate has a water vapor permeability according to DIN 53122 at 38° C. and 90% relative humidity of greater than 1000 g/(m²*d), based on a film thickness of 10 μm, and a watertightness of 0.2 bar, measured according to DIN EN 20811:1992.

* * * * *